United States Patent
Robison et al.

(10) Patent No.: US 9,958,168 B2
(45) Date of Patent: May 1, 2018

(54) COOKING EXHAUST HOOD VENTILATION SYSTEM AND RELATED METHODS

(71) Applicants: Russell Robison, Yamhill, OR (US); Bruce Lukens, Newberg, OR (US); Michael Borntrager, Mayer, MN (US)

(72) Inventors: Russell Robison, Yamhill, OR (US); Bruce Lukens, Newberg, OR (US); Michael Borntrager, Mayer, MN (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 355 days.

(21) Appl. No.: 14/166,060

(22) Filed: Jan. 28, 2014

(65) Prior Publication Data

US 2015/0211748 A1    Jul. 30, 2015

(51) Int. Cl.
  F24C 15/20  (2006.01)
  F24F 11/02  (2006.01)
  F24F 11/00  (2018.01)

(52) U.S. Cl.
  CPC ....... F24C 15/2021 (2013.01); *F24F 11/0079* (2013.01); *F24F 11/025* (2013.01); *Y02B 30/746* (2013.01)

(58) Field of Classification Search
  CPC ... Y02B 30/78; F24F 11/0017; F24F 11/0012; F24F 2011/0032; F24C 15/2021; F24C 15/20
  USPC .......... 454/340, 341, 347; 126/299 R, 299 T
  See application file for complete search history.

(56) References Cited

U.S. PATENT DOCUMENTS

| | | |
|---|---|---|
| 4,284,236 A | 8/1981 | Bradshaw |
| 4,386,733 A | 6/1983 | Bradshaw |
| 4,873,649 A | 10/1989 | Grald et al. |
| 5,067,394 A | 11/1991 | Cavallero |
| 5,143,287 A | 9/1992 | Jardinier |
| 5,259,553 A | 11/1993 | Shyu |
| 5,261,596 A | 11/1993 | Tachibana et al. |
| 5,292,280 A | 3/1994 | Janu et al. |
| 5,309,725 A | 5/1994 | Cayce |
| 5,394,934 A | 3/1995 | Rein et al. |
| 5,400,963 A * | 3/1995 | Ishikawa ............ B60H 1/00735 236/49.3 |

(Continued)

FOREIGN PATENT DOCUMENTS

WO    WO 201/065793    6/2010

*Primary Examiner* — Steven B McAllister
*Assistant Examiner* — Ko-Wei Lin
(74) *Attorney, Agent, or Firm* — Thompson Hine LLP

(57) ABSTRACT

Controlling an exhaust hood system having multiple hood sections each with an exhaust output having an associated damper, each exhaust output feeding to a common downstream fan, where damper position and fan speed control an exhaust flow rate through each hood section, involves monitoring at least one condition of each hood section and, based upon the monitoring, establishing a target flow rate for each hood section; based upon a sum of the target flow rates, establishing a fan speed; and monitoring an actual flow rate through each hood section and responsively controlling damper position to achieve the target flow rate for the hood section. Adjusting fan speed and damper position until damper position for at least one hood section achieves a predetermined open position, while at the same time each hood section satisfies its associated target flow rate, can reduce energy costs associated with system operation.

14 Claims, 8 Drawing Sheets

(56) References Cited

U.S. PATENT DOCUMENTS

| | | |
|---|---|---|
| 5,462,485 A | 10/1995 | Kinkead |
| 5,464,369 A | 11/1995 | Federspiel |
| 5,597,354 A | 1/1997 | Janu et al. |
| 5,707,005 A | 1/1998 | Kettler et al. |
| 5,955,031 A | 9/1999 | King, Jr. |
| 5,971,067 A | 10/1999 | Rayburn et al. |
| 5,976,010 A | 11/1999 | Reese et al. |
| 6,119,529 A | 9/2000 | DiMarco |
| 6,161,764 A | 12/2000 | Jatnieks |
| 6,170,480 B1 | 1/2001 | Melink et al. |
| 6,293,700 B1 * | 9/2001 | Lund ................ G01K 7/13 374/181 |
| 6,369,716 B1 | 4/2002 | Abbas et al. |
| 6,398,118 B1 | 6/2002 | Rosen et al. |
| 6,406,367 B1 | 6/2002 | Chou et al. |
| 6,514,138 B2 | 2/2003 | Estepp |
| 6,578,770 B1 | 6/2003 | Rosen |
| 6,629,886 B1 | 10/2003 | Estepp |
| 6,698,219 B2 | 3/2004 | Sekhar et al. |
| 6,711,470 B1 | 3/2004 | Hartenstein et al. |
| 6,920,874 B1 | 7/2005 | Siegel |
| 6,986,386 B2 | 1/2006 | Sekhar et al. |
| 7,097,111 B2 | 8/2006 | Riley et al. |
| 7,261,243 B2 | 8/2007 | Butler et al. |
| 7,284,382 B2 | 10/2007 | Wong |
| 7,381,245 B2 | 6/2008 | Fleischer |
| 7,632,178 B2 | 12/2009 | Meneely, Jr. |
| 7,699,051 B2 | 4/2010 | Gagas et al. |
| 7,731,098 B2 | 6/2010 | Butler et al. |
| 7,758,407 B2 | 7/2010 | Ahmed |
| 2005/0150387 A1 | 7/2005 | Has |
| 2005/0257540 A1 | 11/2005 | Choi et al. |
| 2005/0277381 A1 | 12/2005 | Banerjee et al. |
| 2006/0117769 A1 * | 6/2006 | Helt ................ F24F 11/0001 62/161 |
| 2006/0186213 A1 * | 8/2006 | Carey ................ F24F 3/0442 236/1 B |
| 2007/0012052 A1 | 1/2007 | Butler et al. |
| 2007/0062513 A1 | 3/2007 | Gagas |
| 2007/0125364 A1 | 6/2007 | Crnkovich |
| 2007/0149109 A1 | 6/2007 | Gu et al. |
| 2007/0155305 A1 | 7/2007 | Heidel et al. |
| 2008/0182506 A1 | 7/2008 | Jackson et al. |
| 2009/0134993 A1 | 5/2009 | Ashworth |
| 2009/0236432 A1 | 9/2009 | Malloy |
| 2009/0308941 A1 | 12/2009 | Patch |
| 2010/0308120 A1 * | 12/2010 | Drew ................ F24F 11/0012 236/46 R |
| 2011/0284091 A1 * | 11/2011 | Livchak ................ F24C 15/2021 137/2 |

\* cited by examiner

COOKING EXHAUST HOOD VENTILATION SYSTEM AND RELATED METHODS

TECHNICAL FIELD

This application relates generally to exhaust systems utilized in commercial cooking environments such as the cooking areas of restaurant, school, hospitals and other institutions, and, more specifically, to a kitchen exhaust hood ventilation system that (i) uses a common fan to draw air from multiple hood sections and/or (ii) is configured for automated or semi-automated self-calibration upon installation.

BACKGROUND

A typical commercial exhaust hood system requires a large amount of energy to run, including energy used to heat, cool and/or dehumidify air removed from the cooking environment, as well as energy used by the fans to put air into the room and remove it. Commercial hood systems are designed to meet the demands of all of the cooking equipment operating at full load, but in reality there are many times when the cooking equipment is operating at less than full load and even some times when certain cooking equipment may not be on at all. In such cases the hood exhaust systems can be slowed down, saving heating, cooling and fan energy consumed.

Systems have been developed in the past to account for these issues. Commonly such systems utilize a temperature sensor in the exhaust duct leading from a hood canopy, and this temperature is used to set fan speed. However, this duct temperature represents the overall average temperature of the system. In reality, not all cooking devices contribute the same amount of heat load. To account for this other systems have been considered that utilize optics, infrared or other means to identify conditions for control of the fan.

Still other systems have been developed in which a plurality of temperature sensors mounted within the hood canopy and spaced apart along a width of the hood canopy are provided for sensing temperatures at respective locations within the hood canopy. The system monitors actual temperature at each location as indicated by the temperature sensors and responsively controlling the fan based upon the monitoring. In particular, each temperature sensor location has am associated rated fan triggering temperature field, and fan speed is controlled based upon the actual temperature at the location having the highest loading of its rated fan triggering temperature field.

It would be desirable to provide a system and method that enhances the overall operation and performance of such ventilation systems.

SUMMARY

In one aspect, a method is provided for controlling a commercial kitchen exhaust hood system of a type having multiple hood sections each with an exhaust output having an associated damper, each exhaust output feeding to a common downstream fan, wherein the operation of the fan pulls exhaust from each hood section, where damper position and fan speed control an exhaust flow rate through each hood section. The method involves: monitoring at least one condition of each hood section and, based upon the monitoring, establishing a target flow rate for each hood section; based upon a sum of the target flow rates, establishing a fan speed; and monitoring an actual flow rate through each hood section and responsively controlling damper position of the hood section to achieve the target flow rate.

One implementation of the above method involves the further step of adjusting the fan speed and the damper position for each hood section until the damper position for at least one hood section achieves a predetermined open position, while at the same time each hood section satisfies its associated target flow rate, in order to reduce fan energy required to maintain the target flow rates.

In one implementation of the above method, the step of monitoring at least one condition of each hood section involves using multiple temperature sensors of each hood section, determining a thermal load condition of each temperature sensor of the hood section and establishing the target flow rate based upon a highest of the determined thermal load conditions.

In one implementation of the above method, the step of monitoring actual flow rate of through each hood section involves evaluating an output signal of a pressure transducer of each hood section.

In one implementation of the above method, the adjusting step involves: (i) determining whether the damper position of any hood section is in the predetermined open position; (ii) if a result of the determination of step (i) is no, decreasing fan speed by an incremental amount; and (iii) repeating steps (i) and (ii) until a result of the determination of step (i) is yes, at which point fan speed is thereafter maintained.

In one implementation of the above method, the predetermined open position is defined as at least 75% open.

In one implementation of the above method, the predetermined open position is defined as at least 85% open.

In a second aspect, a method is provided for controlling the operation of a commercial kitchen exhaust hood system of a type having multiple hood sections each with an exhaust output having an associated damper, each exhaust output feeding to a common downstream fan, wherein the operation of the fan pulls exhaust from each hood section, where damper position and fan speed control an exhaust flow rate through each hood section. The method involves: (a) monitoring multiple temperature sensors of each hood section and determining a thermal load condition of each temperature sensor; (b) for each hood section, identifying a highest thermal load condition from among the thermal load conditions of the hood section; (c) for each hood section, based upon the highest thermal load condition, determining target flow rate for the hood section; (d) summing the target flow rates to define a target system flow rate; and (e) based upon the target system flow rate, defining an operating speed for the fan.

One implementation of the second method involves the further step of adjusting the fan speed and the damper position for each hood section until the damper position for at least one hood section achieves a predetermined open position in order to reduce fan energy required to maintain the target flow rates.

In one implementation of the second method, steps (a), (b) and (c) are repeated such that when in step (b) the highest thermal load condition of a given hood section changes from the thermal load condition of a first temperature sensor to the thermal load condition of a second temperature sensor, the thermal load condition of the first temperature sensor is no longer used to determine the target flow rate for the given hood section and the thermal load condition of the second temperature sensor is instead used to determine the target flow rate for the given hood section.

In one implementation of the second method, each temperature sensor with an associated upper limit temperature that is in part used to determine the thermal load condition of the temperature sensor.

In one implementation of the second method, the upper limit temperature associated with one or more of the temperature sensors is adjusted according to time of day, and a transition from one upper limit temperature to another upper limit temperature occurs automatically based upon tracking of time day.

In one implementation of the second method, the method further includes: establishing multiple flow rate curves, where each flow rate curve defines a relationship of how changes in thermal load condition affect target flow rate; each temperature sensor is assigned one of the flow rate curves; and the flow rate curve assigned to one or more of the temperature sensors is changed according to time of day.

In one implementation of the second method, the transition from use of one of the flow rate curves to the use of the another of the flow rate curves for each temperature sensor occurs automatically based upon tracking of time day.

In a third aspect, a method is provided for automatically adjusting a set of operating parameters for a commercial kitchen exhaust hood arrangement having one or more of (i) a thermal load monitoring system that adjusts exhaust flow based upon the monitored thermal load, (ii) a manual override trigger that enables a user to manually trigger a maximum exhaust mode when needed or (iii) a VOC monitoring system that triggers a maximum exhaust mode when excessive VOC levels are sensed. The method involves: establishing an initial set of operating parameters for the exhaust hood arrangement; and establishing an adjustment time period during which certain conditions of the exhaust hood arrangement will be detected and utilized to tune the set of operating parameters, wherein the certain conditions include one or more of (i) manually triggered overrides or (ii) excessive temperature conditions or (iii) excessive VOC conditions.

In one implementation of the third method, the method further involves: determining whether a number of manually triggered overrides is excessive and, if so, adjusting the set of operating parameters in a manner that will produce increased exhaust flow for a given thermal loading.

In one implementation of the third method, the determining step includes: determining whether the number of manually triggered overrides is highly excessive or moderately excessive, and, if the number of manually triggered overrides is moderately excessive but not highly excessive, adjusting the set of operating parameters in a manner that will produce a first level of increased exhaust flow for a given thermal loading; or if the number of manually triggered overrides is highly excessive, adjusting the set of operating parameters in a manner that will produce a second level of increased exhaust flow for a given thermal loading, where the second level is higher than the first level.

In one implementation of the third method, the adjustment time period is a specified number of weeks, and the determining step is carried out on a weekly basis using a calculated average number of manually triggered overrides.

In one implementation of the third method, the initial set of operating parameters includes operating parameters for different time segments during each day of the week, and the determining step is carried out independently for each time segment of each day.

In one implementation of the third method, the method further involves: establishing multiple flow rate curves, where each flow rate curve defines a relationship of how changes in thermal load condition affect target flow rate, and each flow rate curve has a common start point and a common end point; wherein the adjusting of the set of operating parameters involves changing the flow rate curve that is used to define exhaust flow based upon monitored thermal load.

In one implementation of the third method, the commercial kitchen exhaust hood arrangement includes multiple temperature sensors, and each temperature sensor includes an associated flow rate curve that in part defines the operating parameters of the exhaust hood arrangement.

In one implementation of the third method, the method further involves: defining at least one upper temperature limit for the commercial kitchen exhaust hood arrangement; and determining whether a number of temperature conditions in excess of the upper temperature limit is excessive and, if so, increasing the upper temperature limit.

In one implementation of the third method, the determining step includes: determining whether the number of temperature conditions in excess of the upper temperature limit is highly excessive or moderately excessive, and, if the number of temperature conditions in excess of the upper temperature limit is moderately excessive but not highly excessive, increasing the upper temperature limit by a first amount, or if the number of temperature conditions in excess of the upper temperature limit is highly excessive, increasing the upper temperature limit by a second amount, where the second amount is greater than the first amount.

In one implementation of the third method, the adjustment time period is a specified number of weeks, and the determining step is carried out on a weekly basis using a calculated average number of temperature conditions in excess of the upper temperature limit per week.

In one implementation of the third method, the initial set of operating parameters includes operating parameters for different time segments during each day of the week, and the determining step is carried out independently for each time segment of each day.

In one implementation of the third method, further steps include defining at least one VOC limit for the commercial kitchen exhaust hood arrangement; and determining whether a number of VOC conditions in excess of the VOC limit is excessive and, if so, adjusting the set of operating parameters in a manner that will produce increased exhaust flow for a given thermal loading.

In one implementation of the third method, the determining step includes: determining whether the number of VOC conditions in excess of the VOC limit is highly excessive or moderately excessive, and, if the number of VOC conditions in excess of the VOC limit is moderately excessive but not highly excessive, adjusting the set of operating parameters in a manner that will produce a first level of increased exhaust flow for a given thermal loading; or if the number of VOC conditions in excess of the VOC limit is highly excessive, adjusting the set of operating parameters in a manner that will produce a second level of increased exhaust flow for a given thermal loading, where the second level is higher than the first level.

In one implementation of the third method, further steps include establishing multiple flow rate curves, where each flow rate curve defines a relationship of how changes in thermal load condition affect target flow rate, and each flow rate curve has a common start point and a common end point; wherein the adjusting of the set of operating parameters involves changing the flow rate curve that is used to define exhaust flow based upon monitored thermal load.

In a fourth aspect, a method is provided for controlling the operation of a commercial kitchen exhaust hood system of a type having multiple hood sections each with an exhaust output having an associated damper, each exhaust output feeding to a common downstream fan, wherein the operation of the fan pulls exhaust from each hood section, where damper position and fan speed control an exhaust flow rate through each hood section. The method involves: establishing a target flow rate for each hood section, wherein a sum of all of the target flow rates defines a target overall hood system flow rate; controlling the fan speed and the damper position of each hood section to achieve each the target flow rate of each hood section; identifying a full flow demand call from a specific hood section from among the multiple hood sections, the full flow demand call defining a full flow target rate for the specific hood section, and responsively: (i) determining a differential flow target rate as the difference between the full flow target rate of the specific hood section and the flow target rate of the specific hood section; (ii) increasing the fan speed by a percentage amount that is proportional to A×B, where: A is the differential flow target rate divided by the full flow target rate, B is the target flow rate of the specific hood section divided by the target overall hood system flow rate; and (iii) subsequently adjusting damper position of each hood section to achieve the full flow target rate in the specific hood section and the flow target rate of each other hood section.

In one implementation of the fourth method, the full flow demand call is triggered by one of (i) a manual override of the specific hood section or (ii) an automatically detected excess temperature condition of the specific hood section or (iii) an automatically detected excessive rate of temperature change condition or (iv) an automatically detected excessive VOC condition.

In a fifth aspect, a method is provided for identifying location of a maintenance or service issue in a commercial kitchen exhaust hood system of a type having multiple hood sections, each of the hood sections including an associated internal light element. The method involves: monitoring at least one condition within each hood section; based upon the monitoring, identifying a maintenance or service issue for a specific hood section from among the multiple hood sections; and flashing the light element of the specific hood section only.

In one implementation of the fifth method, the commercial kitchen hood exhaust system includes a user interface display and the method further involves: in response to identification of the maintenance or service issue, effecting an operator alert on the user interface display; providing personnel with a triggerable find function via the user interface display; and carrying out the flashing step only after the find function is triggered.

In one implementation of the fifth method, the identifying involves detecting a restricted flow condition of the specific hood section.

In one implementation of the fifth method, the restricted flow condition is identified by monitoring an out of bounds condition of a flow control damper associated with the specific hood section.

The details of one or more embodiments are set forth in the accompanying drawings and the description below. Other features, objects, and advantages will be apparent from the description and drawings, and from the claims.

DETAILED DESCRIPTION

Figure 1:
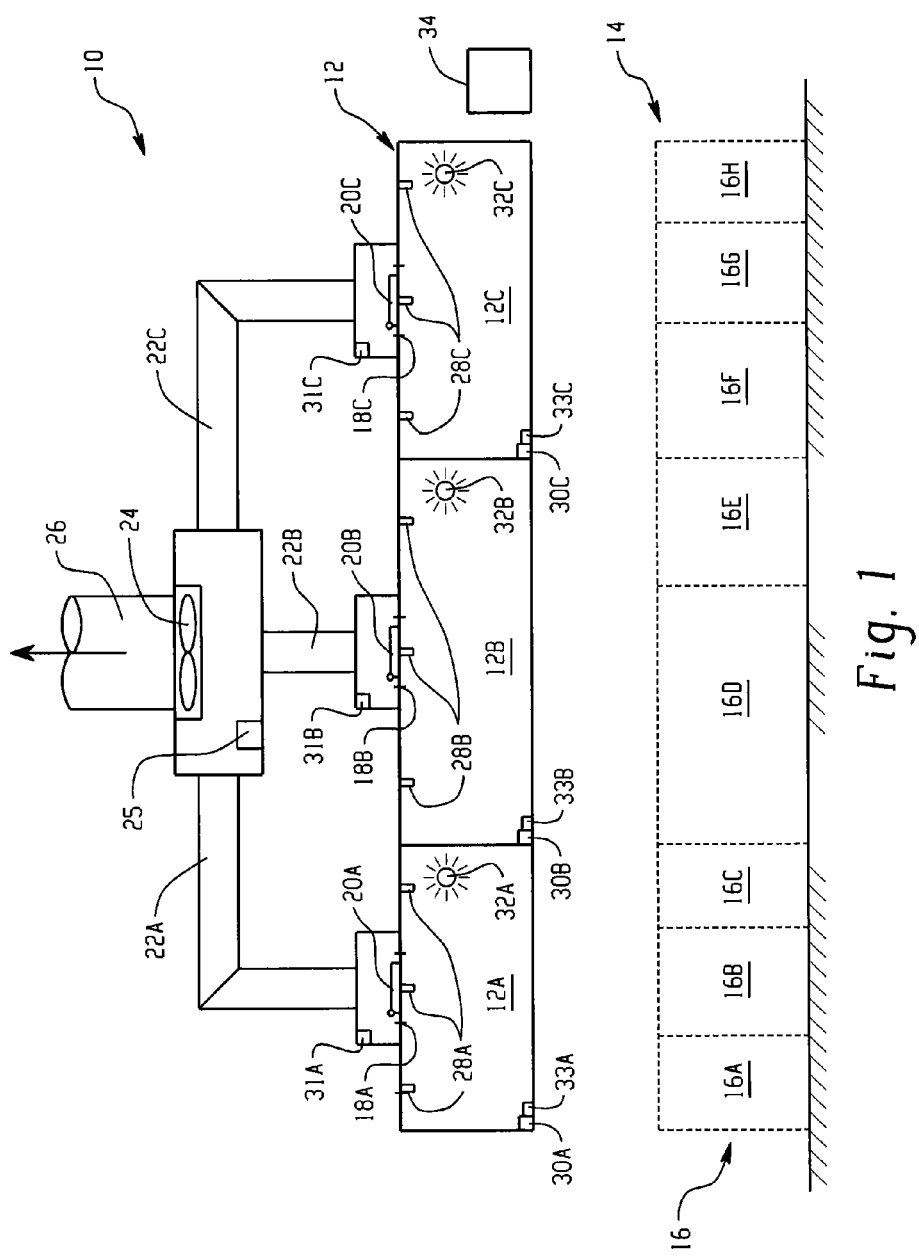
FIG. 1 a schematic front elevation view of an exemplary cooking exhaust hood system in a cooking environment.

Referring to FIG. 1, a cooking exhaust system 10 is shown and includes a hood assembly 12 having multiple hood sections 12A, 12B, 12C. The number of hood sections could vary from the illustrated three. The hoods assembly may be formed by a single hood canopy with a downwardly facing inlet opening and internal divider walls to create the hood sections, by multiple hood canopies arranged side-by-side adjacent each other or by some combination of the two. The hood assembly 12 is located above a cooking area 14 having multiple cooking devices 16A-16H. By way of example, cooking devices 16 could be any of steam ovens, griddles, fryers, ranges etc. and any combination of different cooking devices. In the illustrated embodiment each hood section 12 is located above multiple cooking devices, but it is possible that one or more hood sections could be dedicated to only a single cooking device.

Each hood section includes an exhaust output 18A-18C having an associated movable damper 20A-20C (e.g., with an associated actuator such as a motor to control position). Changing the position of the damper changes the size of the flow area out of the particular hood section. Each exhaust output feeds (e.g., via a respective duct 22A-22C) to a common downstream fan or blower 24 that moves air to a common output duct 26 to, for example, exhaust the air from the building. Operation of the fan 24 pulls exhaust from each hood section 12A-12C. In this arrangement, damper position and fan speed combine to set or control an exhaust flow rate through each hood section. The system may also include a return or make-up air plenum (e.g., located along the front of the hood assembly) that directs make-up air (e.g., air that may be conditioned) back into the kitchen environment (e.g., downward along the front of the hood assembly).

Each hood section includes one or more temperature sensors 28A-28C mounted within the hood section and spaced apart along a width of the hood section for sensing temperatures at respective locations within the hood section. The sensors may, by way of example, take the form of resistance temperature detectors (RTDs). However, other temperature sensors might also be used. The temperature sensors detect "sensible" heat within the hood. That is, the sensors are primarily intended to detect convective heat as opposed to radiant or latent heat. As explained in U.S. patent application Ser. No. 13/624,462, filed Sep. 21, 2012, which is incorporated herein by reference, for each hood section each temperature sensor or temperature sensor location has a rated fan triggering temperature field, and a call for fan or fan speed from each hood section is defined based upon the actual temperature at the location having the highest loading of its rated fan triggering temperature field. By way of example, for each location, the rated fan triggering temperature field is defined by a lower limit and an upper limit, the lower limit defined as a set number of degrees above ambient temperature and the upper limit defined by a specified number of degrees above ambient temperature. The rated fan triggering temperature field for a temperature sensor is a field of temperatures over which that sensor may be used to control fan speed between a low or minimum speed (e.g., when the temperature sensor indicates a temperature at the lower limit of the field) and a high or full speed (e.g., when the temperature sensor indicates a temperature at the upper limit of the field). The upper limit of a fan triggering temperature field may be defined as the rated temperature capacity.

Figure 2:
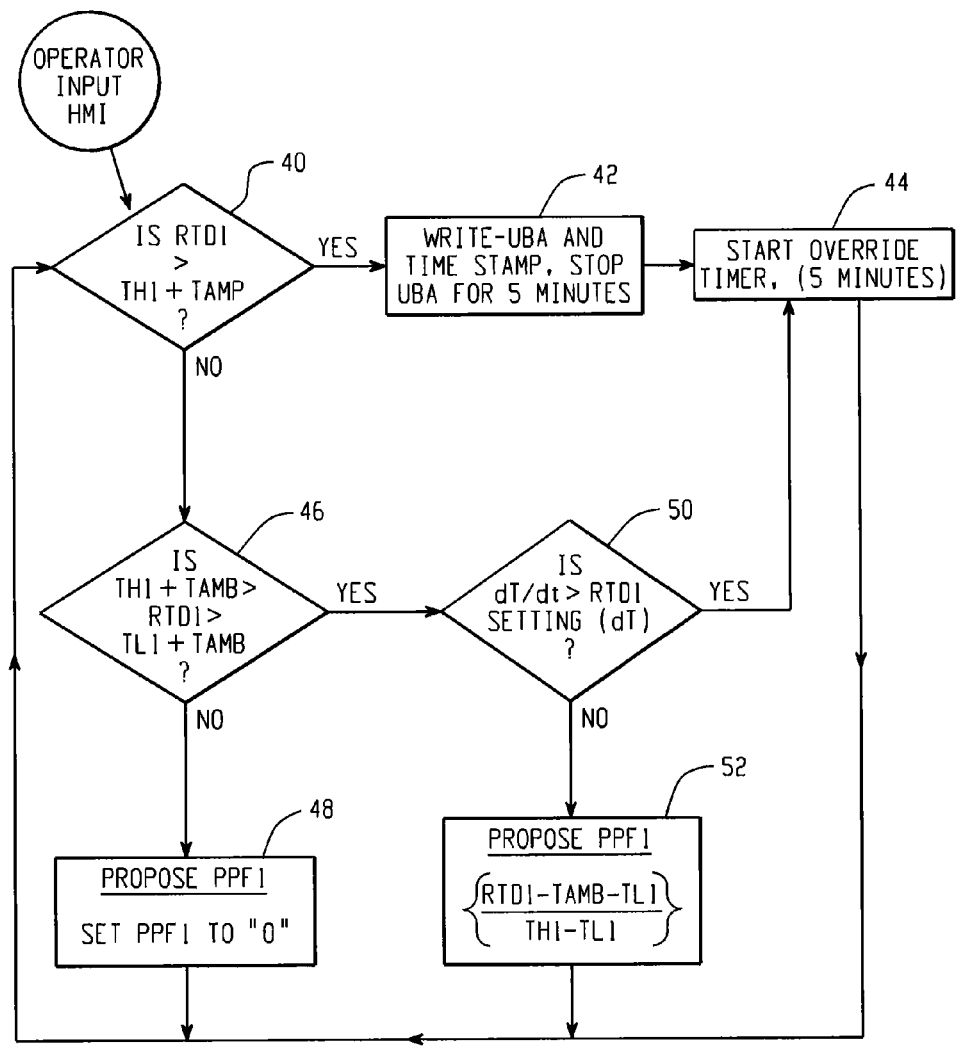
FIG. 2 is a flow chart showing temperature sensor monitoring and establishment of a proposed percent fan.

In operation, at least one condition of each hood section is monitored. Based upon the monitoring, a target flow rate for each hood section is established. An operating speed for common fan 24 is established based upon the sum of the target flow rates. By way of example, the monitoring involves sensing a temperature of each hood section (or multiple temperatures), determining a thermal load condition of each hood section (e.g., the highest thermal loading among the temperature sensors in the hood section) and establishing the target flow rate based upon a highest of the determined thermal load conditions (e.g., the highest thermal load condition from among the hood sections). By way of example, each temperature sensor may be evaluated to define an associated proposed percent fan (PPF) based upon the thermal loading condition of the temperature sensor. FIG. 2 shows this process for one exemplary temperature sensor RTD1. At step 40, a determination is made as to whether the actual temperature of temperature sensor RTD1 is greater than the rated temperature capacity (TH1+TAMB) for the temperature sensor RTD1, where TAMB is the ambient temperature of the kitchen environment and TH1 is predefined value. If the result of the determination is yes, that means the temperature associated with sensor RTD1 is higher than desired and at step 42 a record of the excessive temperature condition is recorded (for use in the learning operation described below) and at step 44 an override is initiated for a set time period (e.g., in this case 5 minutes, though other time periods could be used and the system could allow for operator variance of that time period, or could automatically vary the time period based upon the degree of the excess temperature condition). Step 44 also defines the PPF1 as being 100% for that temperature sensor RTD1. If the result if the determination at step 40 is no, then at step 46 a determination is made as to whether the actual temperature of temperature sensor RTD1 is between the upper limit (TH1+TAMB) and the lower limit (TL1+TAMB). If the result of the determination is NO, then the temperature at temperature sensor RTD1 suggests that the fan need not run at all, and at step 48 the proposed percent fan PPF1 is set to zero. On the other hand, if result of the determination is yes, then the temperature at temperature sensor RTD1 suggests that some level of an operation is needed. Thus, at step 50, a check is made to determine whether there has been an excessively rapid change in temperature at temperature sensor RTD1. If so, then that is an indication of a potential critical condition and the sequence moves to step 44. If not, then at step 52 a proposed percent fan can be defined based upon the degree of thermal loading of the rated fan triggering temperature field of temperature sensor RTD1. Specifically, the proposed percent fan is defined as the difference between the actual temperature at temperature sensor RTD1 and the lower limit divided by the size of the rated fan triggering temperature field. Similar proposed percent fan values can be defined for each temperature sensor in each hood section.

It should be understood that the predefined value TH1 for each temperature sensor, which is used to set the upper limit, will typically vary throughout the day. That is, the upper limit temperature associated with the temperature sensors is adjusted according to time of day, and a transition from one upper limit temperature to another upper limit temperature occurs automatically based upon tracking of time day. By way of example, each day may be divided into 48 different thirty minute periods, and thus it is possible for the value TH1, and thus the upper limit, for any given temperature sensor to vary 48 times throughout the day. Of course, variations on the number and duration of the time periods are possible. Likewise, different days of the week can have different predefined values TH1 for a given time of day. These variations provide a system that can be adapted to the different demands placed on the ventilation system at different times of day and on different days of the week, as will be described in more detail below.

Figure 3:
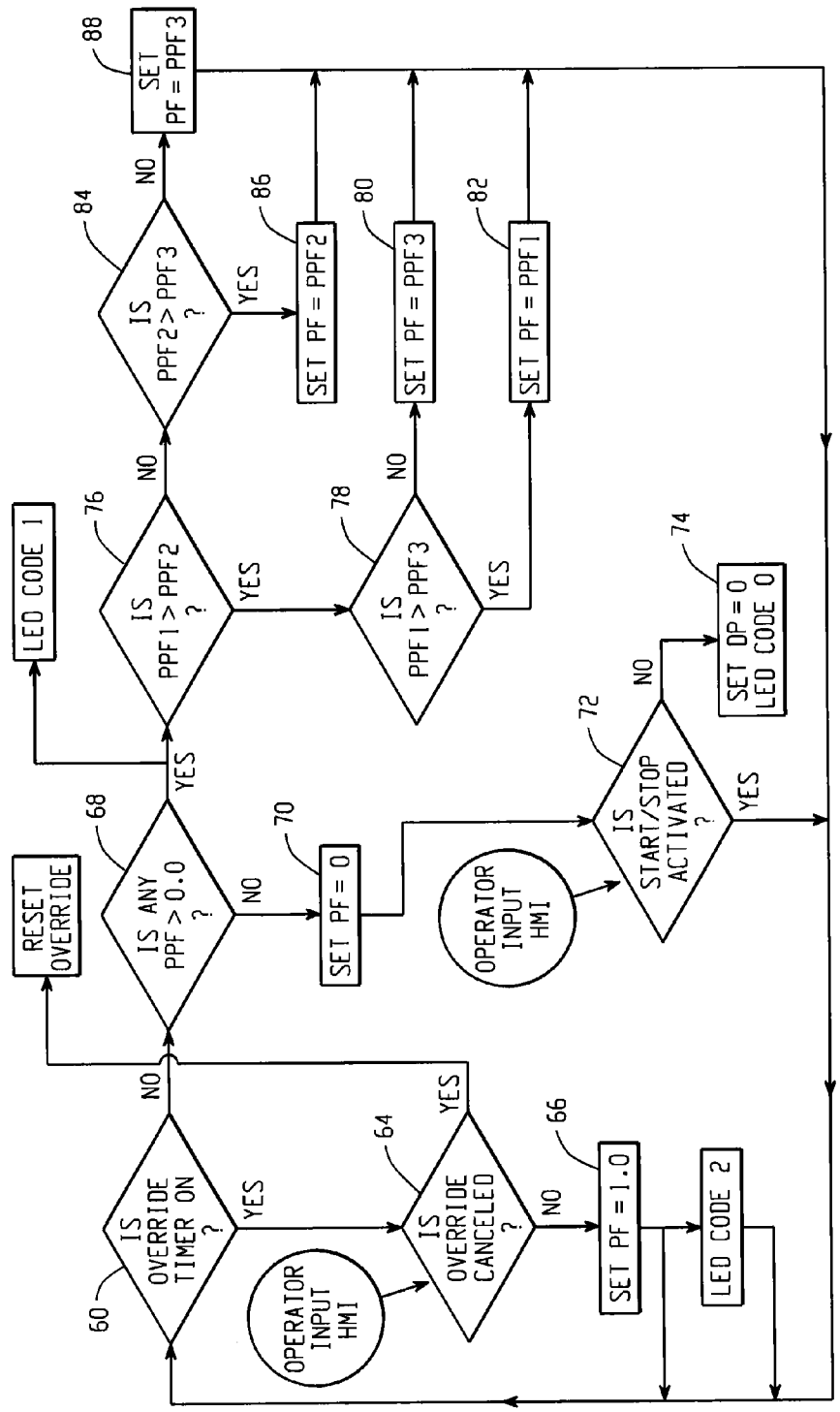
FIG. 3 is a flow chart showing selection of a proposed percent fan for a hood section.

For the purpose of air volume control, the highest percent fan value from among the temperature sensors in each hood section can then be used to control or set the the target flow rate for the hood section. In this regard, reference is made to FIG. 3 where PPF1, PPF2 and PPF3 represent the proposed percent fan indicated by each of the three temperature sensors of a given hood section. Per steps 60 and 62, if the override timer is on, and the override has not been canceled, then the actual percent fan is set to 100% (indicated as 1.0 in step 64). The override might be the result of any of (i) an over temperature condition (e.g., a YES determination in step 40 of FIG. 2), (ii) a manual trigger by a user or (iii) some other detected condition that causes an automatic full fan speed condition, such as an excessive VOC condition (e.g., as sensed by a VOC sensor 33A, 33B, 33C associated with head hood section, where the sensors are arranged to detect VOC levels at the internal side of the hood near the lower edge of the hood). If there is no override, or if the override has been reset, then at step 68 a determination is made as to whether any proposed percent fan is above zero. If not, then the actual percent fan can be set to zero at step 70. At step 72, if the exhaust system is operating, then the target flow rate for the given hood section will be set to its lowest level, or turndown level (e.g., as defined by the lower end of the flow rate curves shown in FIG. 5). If the system is not operating, then the damper position will be set to zero, or closed, at step 74, and the system will shut down. If at least one of the proposed percent fan values is greater than zero, then the sequence of steps 76 through 88 is used to set the actual percent fan PF to the highest of the PPF1, PPF2 and PPF3 values. During normal operation these evaluation and control steps are repeatedly carried out so that when the highest thermal load condition changes from the thermal load condition of a first temperature sensor to the thermal load condition of a second temperature sensor, the thermal load condition of the first temperature sensor is no longer used to determine the target flow rate and the thermal load condition of the second temperature sensor is instead used to determine the target flow rate.

In an arrangement of the type described above, the fan speed is set according to the sum of the target flow rates. That is, a hood section controller of each hood section (e.g., 31A, 31B, 31C), which monitors the temperature sensors, defines target flow rate and controls the damper position, sends the target flow rate to a fan controller (e.g., 25) that sums the target flow rates and sets the fan speed based upon the total system target flow rate. Notably, the conditions in one hood section may suggest a high flow rate through the hood section is needed, but in another hood section the required flow rate may not be very high. For this reason, a target flow rate for each hood section is determined based upon the actual conditions in that hood section. Once fan speed is set, an actual flow rate through each hood section is monitored and damper position of the hood section is responsively controlled to achieve the target flow rate for the hood section. Both the fan speed and the damper position for each hood section are thereafter adjusted until the damper position for at least one hood section achieves a predetermined open position, while at the same time each hood section satisfies its associated target flow rate. Achieving the open damper condition in at least one hood section reduces the fan energy required to maintain the target flow rates.

Figure 4:
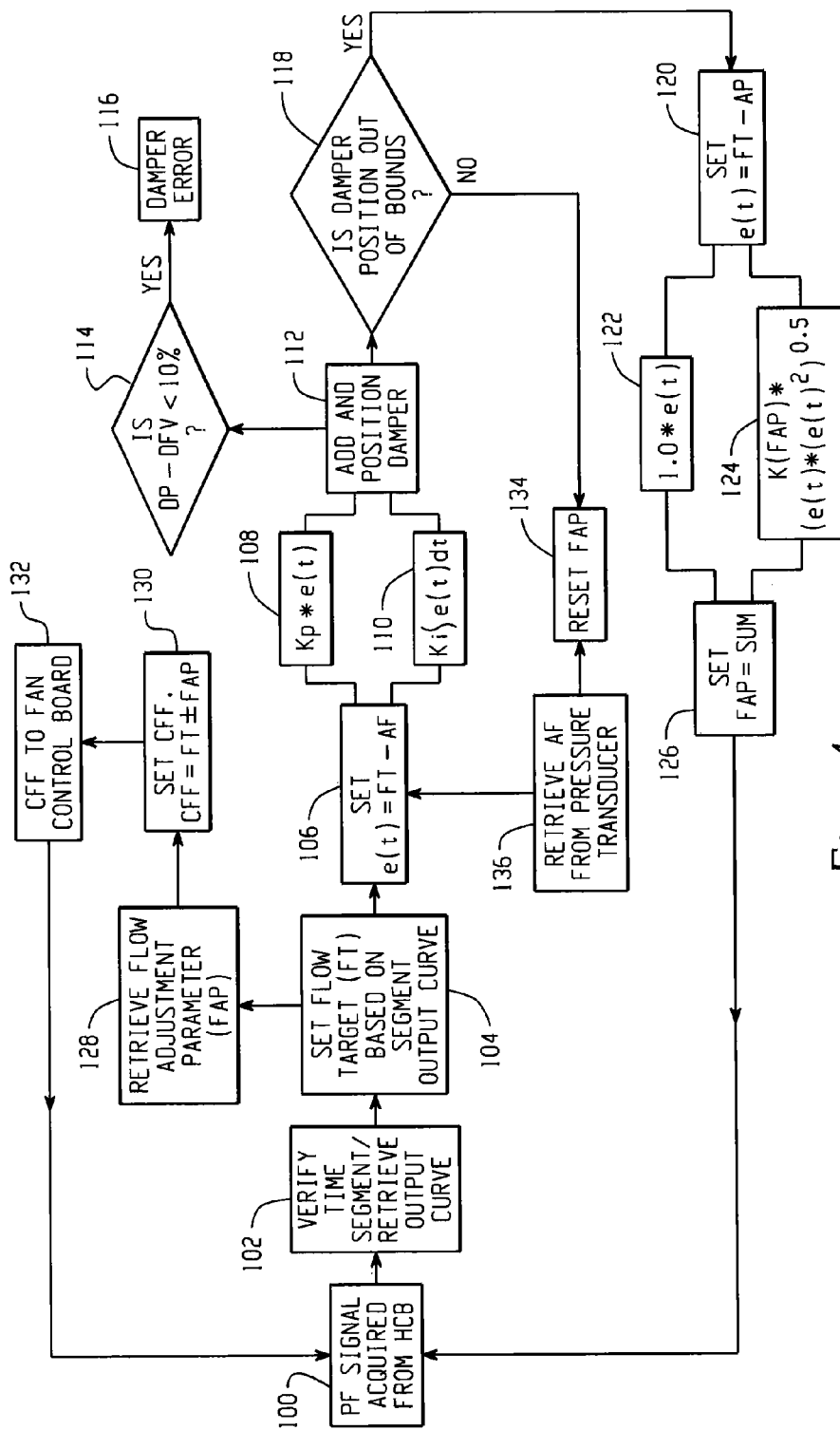
FIG. 4 is a flow chart showing target flow rate setting and damper control for a hood section.
Figure 5:
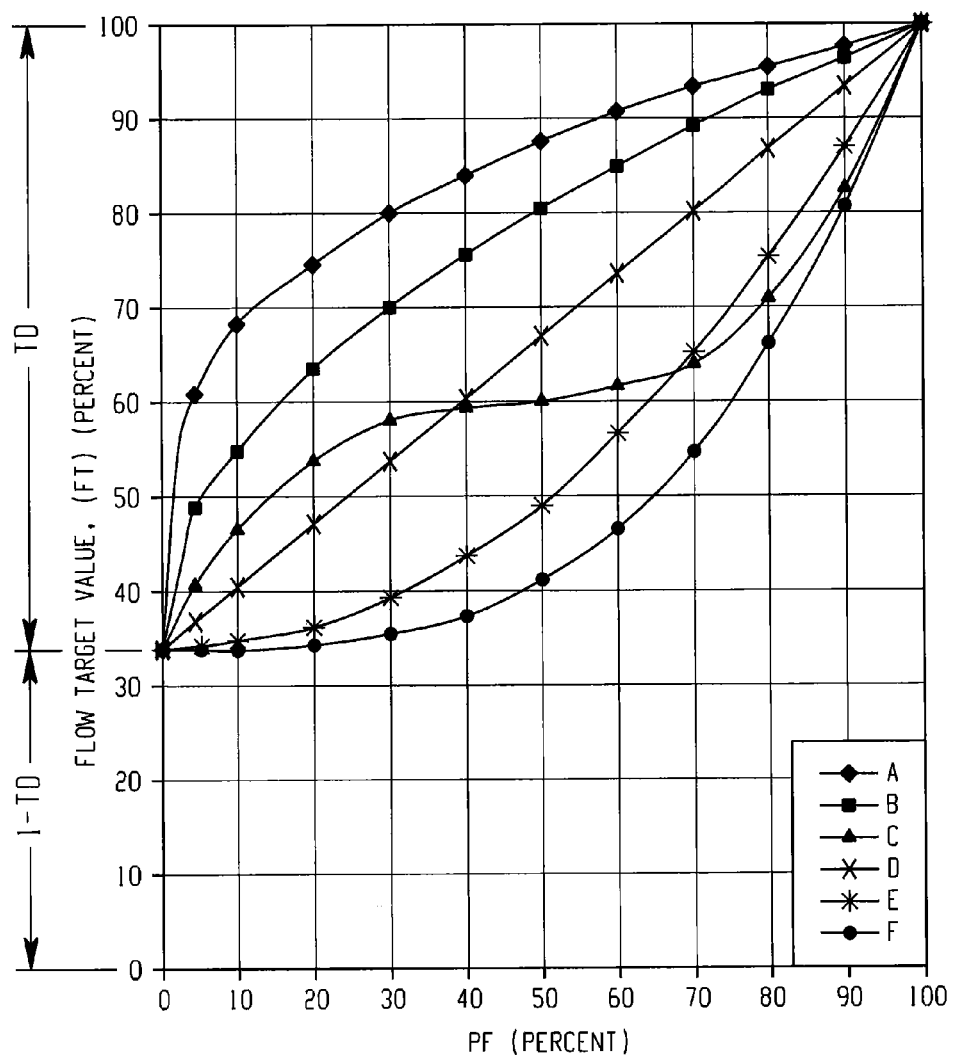
FIG. 5 shows exemplary flow target output curves based upon percent fan.
Figure 6:
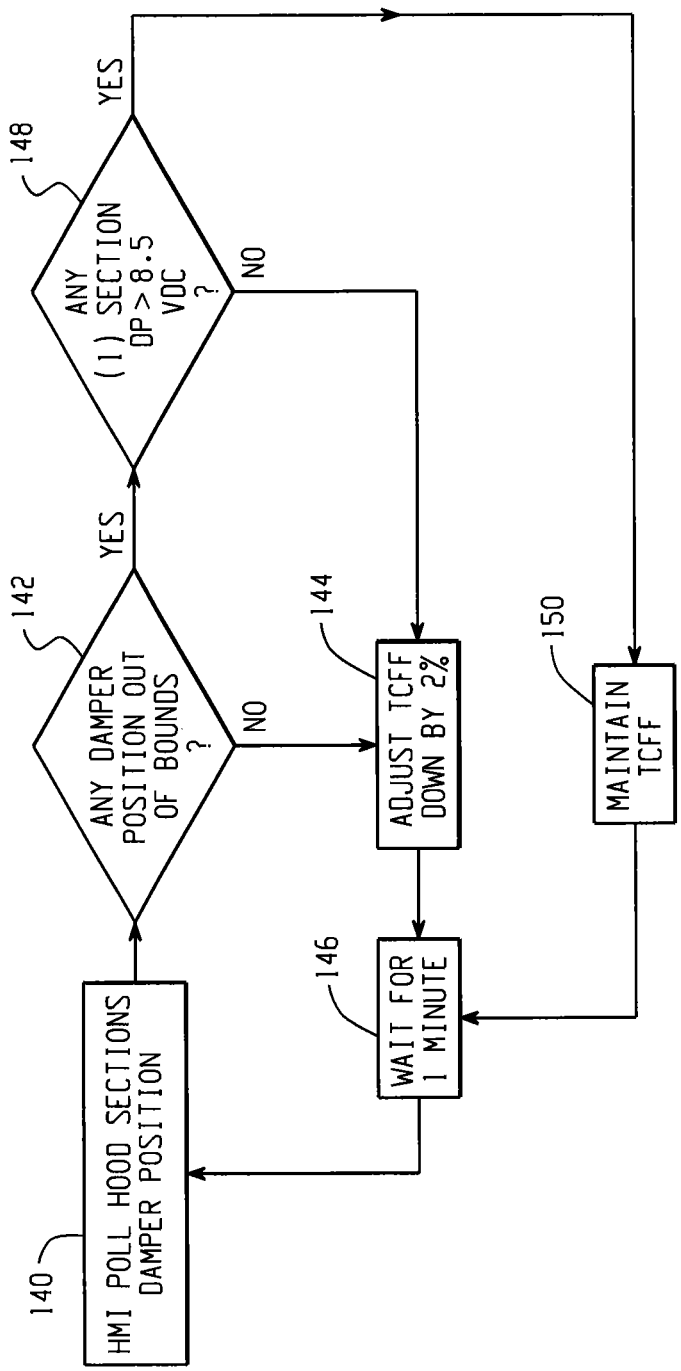
FIG. 6 is a flow chart showing damper control to place at least one damper in a predetermined open condition.

By way of example, and referring to the flow charts of FIGS. 4 and 6, one implementation of the process of the preceding paragraph is shown. At step 100 the actual percent fan PF for a hood section (e.g., determined as indicated above) is acquired. At step 102 the applicable output curve is identified (e.g., one of the flow rate curves A-F shown in FIG. 5 according to the temperature sensor that triggered the PF) and retrieved according to day and time (e.g., it being understood that different output curves will generally be assigned to different time periods based upon predefined data or learned data as described in more detail below). The target flow rate for the hood section is then defined by the selected curve per step 104 (e.g., as a percentage of the predefined maximum flow rate for the hood section). Steps 106, 108, 110 and 112 represent a PI control that defines the desired damper position for the hood section and sets the damper to that position. Steps 114 and 116 represent a damper error position monitor that outputs a damper error if the actual damper position is offset from expected by more than a defined amount (e.g., 10% or some other defined or definable amount). Steps 118, 120, 122, 124 and 126 represent a damper out of bounds monitor that will output a fan adjustment parameter FAP if the damper is position is out of bonds (i.e., too far open or too far closed). The FAP is used in steps 128, 130 and 132 to alter the call for fan for the hood section which is sent to the fan controller to be summed with the call for fan from the other hood sections in order to determine the fan operating speed. Including the FAP into the CFF will eventually cause the position of the damper to be adjusted in order to bring the damper back into bounds. When the damper position is not out of bounds at step 118, the FAP is reset (e.g., to zero) and the actual flow AF in the hood section is retrieved (e.g., as may be indicated by a 4-20 mA signal from a pressure transducer of the hood section). The difference between the flow target FT and the actual flow AF at step 106 is then used to adjust the damper position to achieve the flow target FT.

Referring to the flow rate curves of FIG. 5, the flow target is the Y-axis value of the selected, applicable curve. The bottom or lowest value on the curves is the turndown value TD. The governing function is generally:

$$FT=F(PF)*TD+(1-TD),$$

where F(PF) is the output function of the curve and TD is the turndown as indicated above. For example, for a 60 hertz fan, if the fan speed can go as low as 20 hertz, then the turndown TD is 66%. Similar to the predefined values TH1 mentioned above, the applicable set output curve for each hood section can vary for different times of day and different days of the week, with transition from use of one curve to another occurring automatically within the control process.

Turning now to FIG. 6, the basic control process for fan speed adjustment and damper position optimization is shown, which places at least one damper in the predetermined open condition. Specifically, at step 140 the damper position of each hood section is determined and at step 142 a determination is made as to whether any damper is out of bounds. If not, at step 144 the total call for fan (which is used to define fan speed) is adjusted down or decreased by a specified or incremental amount (e.g., 2%) and a wait period (per step 146) is initiated to allow the damper positions to adjust (per the FIG. 4 process) in attempt to maintain the applicable flow target for each hood section. The damper positions are then re-evaluated per steps 140 and 142. Once at least one damper is determined out of bounds at step 142, at step 148 a verification is made as to whether any damper section is in the predetermined open position (e.g., with a high voltage value of 8.5 from the damper sensor being indicative of the fully open position). If not, then steps 144 and 146 are repeated. If so, then at step 150 the call for fan (or fan speed) is maintained at the last TCFF value. By way of example, the predetermined open condition may be 75% open, or 85% open, though other variations are possible.

In terms of reducing energy consumption of a given exhaust hood system, it is important for the system to be set up to operate in accordance with the types of cooking equipment and cooking operations that take place. Typically this is achieved by evaluating the proposed installation and making certain assumptions. However, the evaluation and assumptions are rarely, if ever, perfect, and therefore numerous adjustments typically need to be made by installation/service personnel after the fact. The present system attempts to reduce that need by learning the needs of the install environment.

Specifically, a method is provided for automatically adjusting a set of operating parameters for a commercial kitchen exhaust hood arrangement having one or more of (i) a thermal load monitoring system that adjusts exhaust flow based upon the monitored thermal load, (ii) a manual override trigger (e.g., an override button 30A-30C for each hood section as shown in FIG. 1) that enables a user to manually trigger a maximum exhaust mode when needed or (iii) a VOC monitoring system that detects excessive VOC levels in each hood section. The method involves establishing an initial set of operating parameters for the exhaust hood arrangement (e.g., by evaluation and assumption per above). An adjustment time period is established during which certain conditions of the exhaust hood arrangement will be detected and utilized to tune the set of operating parameters, wherein the certain conditions include one or more of manually triggered overrides or excessive temperature conditions or excessive VOC conditions. By way of example the time period may be a specified number of weeks, such as 12 weeks, though variations are possible.

The method involves determining whether a number of manually triggered overrides is excessive and, if so, adjusting the set of operating parameters in a manner that will produce increased exhaust flow for a given thermal loading. Depending upon whether the number of manually triggered overrides is highly excessive or moderately excessive, different adjustments can be made (e.g., if the number of manually triggered overrides is moderately excessive but not highly excessive, adjusting the set of operating parameters in a manner that will produce a first level of increased exhaust flow for a given thermal loading; and if the number of manually triggered overrides is highly excessive, adjusting the set of operating parameters in a manner that will produce a second level of increased exhaust flow for a given thermal loading, where the second level is higher than the first level).

Figure 7:
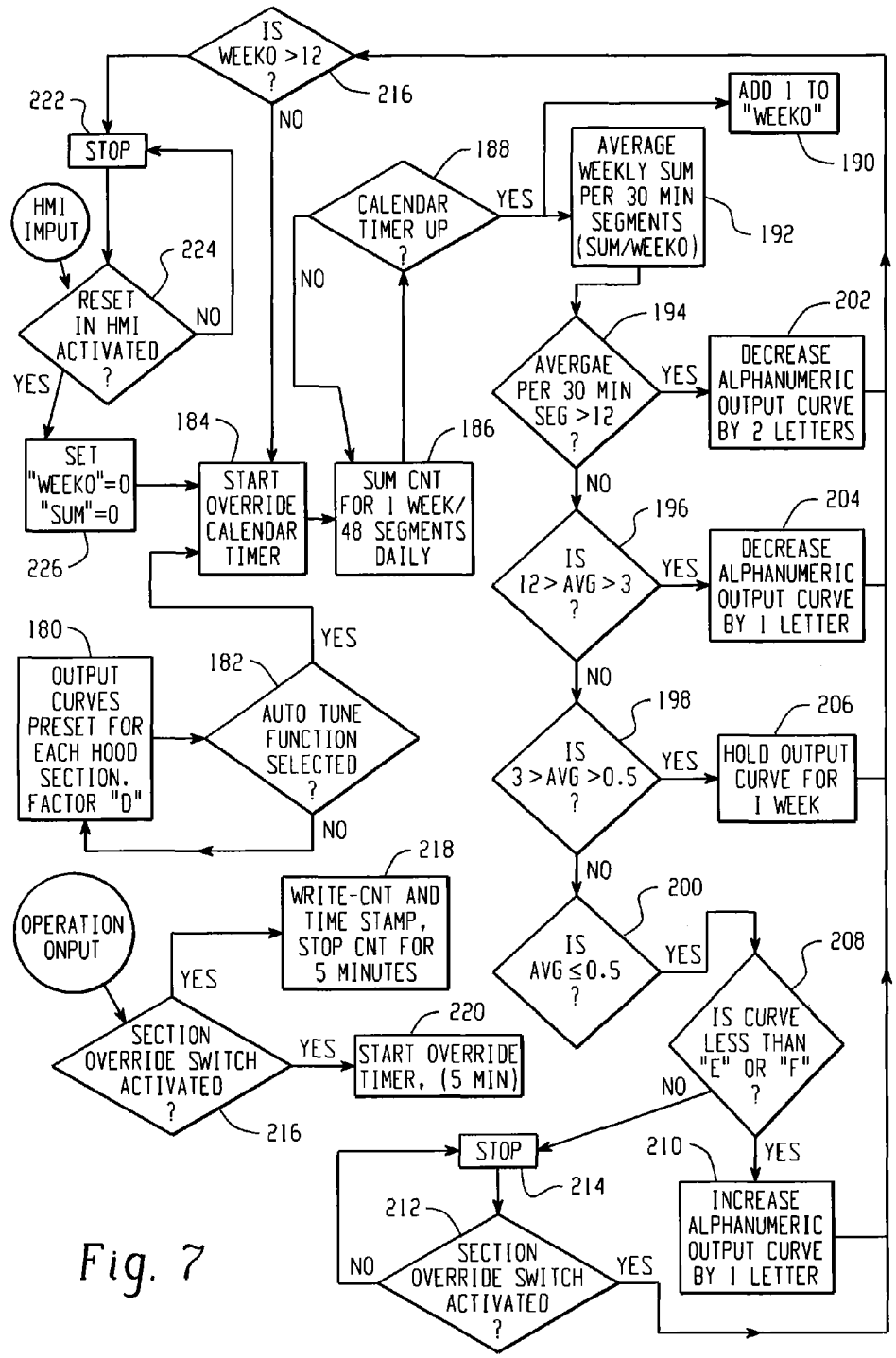
FIG. 7 is a flow chart of exhaust hood set-up process steps that adjust flow rate curves based upon monitored manual overrides.

Referring to FIG. 7, a process is shown which adjusts the applicable flow rate curves based upon manual overrides that are triggered. At step 180 the applicable flow rate curves are preset (e.g., based upon evaluation and assumptions per above). If the auto-tune function of the system is activated per step 182, then an override calendar timer is started in step 184. By way of example, the override calendar timer may be a week long. During that week, a count is maintained of the number of manual overrides that are triggered per step 186. By way of example, the count may be tracked for the 48 different segments of the day, each 30 minutes long. Likewise, the count is maintained for each hood section. The record of manual overrides can be tracked based upon time stamp data associated with each override, per steps 216 and 218. Moreover, when a manual override is triggered an override timer may also be triggered so that the override only lasts for a set time period (e.g., 5 minutes).

Once the calendar time is up at step 188 (e.g., the week is over), the week count ins incremented at step 190 and an evaluation takes place to determine whether to adjust the applicable flow rate curves for each time segment, per steps 192-210. Each 30 minute segment (for each hood section) is evaluated to determine whether the number of manual overrides is highly excessive (e.g., more than 12 per step 194), in which case the applicable flow rate curve is shifted by two levels per step 202 (e.g., from D to B relative to the curves of FIG. 5). If the manual overrides are not highly excessive, but instead are moderately excessive (e.g., between 3 and 12 per step 196), then the applicable flow rate curve is shifted by one levels per step 204 (e.g., from D to C relative to the curves of FIG. 5). If manual overrides have occurred, but the number is not highly excessive or moderately excessive (e.g., between 3 and 0.5 per step 198), then the applicable flow rate curve is not changed per step 206. If the manual overrides are, on average, not occurring (e.g., less than 0.5 per step 200), then the applicable flow rate curve may be shifted in the opposite direction by one level (e.g., from D to E) per step 210, unless the applicable flow rate curve is already one of the less aggressive curves E or F per step 208.

This process is repeated for the full time period (e.g., 12 weeks in this example), per step 216, which returns to step 184 unless the full time period is complete. Notably, after the first week, the number of manual overrides for each 30 minute time segments that is evaluated includes all weeks to date. Thus, in week 2 during steps 194-200 the manual override count being evaluated for any given time segment and hood section is actually an average of the first two weeks for that time segment and hood section. Likewise, in week 3 during steps 194-200 the manual override count being evaluated for any given time segment and hood section is actually an average of the first three weeks for that time segment and hood section, and so on. This technique helps the system hone in on the proper flow rate curve without bouncing back and forth unnecessarily. That is, it provides a convergence and the appropriate flow rate curve from one direction. Once the full twelve weeks have been evaluated, the tuning process is stopped per step 222. The flow rate curves that are in place for each time segment and hood section at the end of the tuning period are then maintained for ongoing operation of the exhaust system, unless the tuning process is restarted (e.g., as by a reset operation per steps 224 and 226).

Excessive VOC conditions can be tracked and handled in the same manner as the manual override conditions in FIG. 7, with curve adjustments being made based upon the number of excessive VOC conditions. In another embodiment, the manual overrides and excessive VOC conditions could be added together and used in combination to make the decision of whether and how to adjust the applicable flow rate curve. Moreover, excessive VOC conditions could also be used to make an immediate adjustment to the utilized flow rate curve during normal operation of the hood system (e.g., even after the learning process has been completed).

Figure 8:
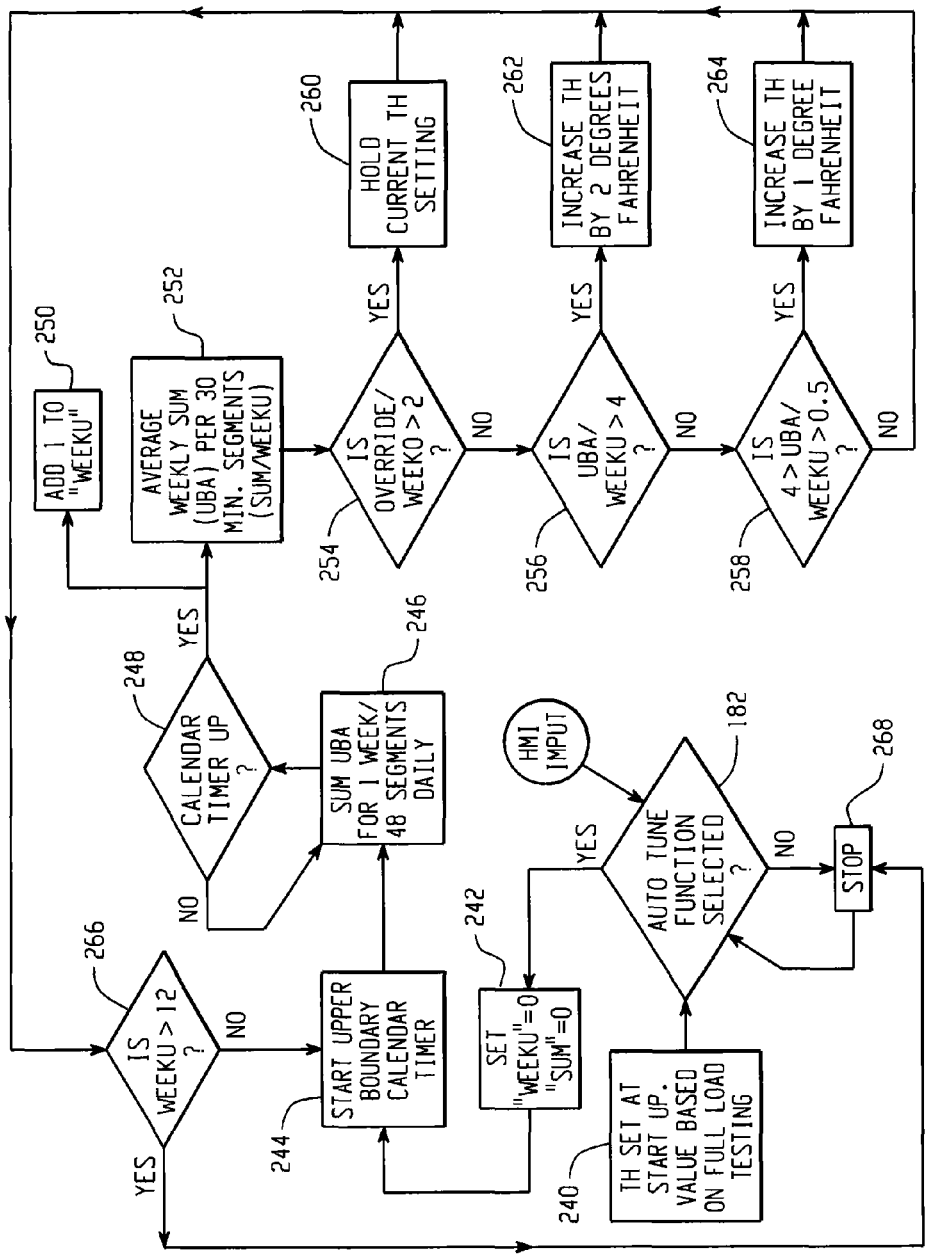
FIG. 8 is a flow chart of exhaust hood set-up process steps that adjust temperature limits based upon monitored excessive temperature conditions.

Referring to FIG. 8, an exemplary flow process in relation to adjustment of the temperature limits as triggered by a high or excessive temperature condition is shown. At step 240 the applicable TH values for each temperature sensor are preset (e.g., based upon evaluation and assumptions per above, or based upon a full load test operating sequence with all cooking equipment running). When the auto-tune function is activated per step 182, the calendar time period is started per steps 242 and 244 and in step 246 the excessive temperature conditions (e.g., represented by UBA or upper boundary alerts, when the temperature of any temperature sensor goes above its upper limit of TAMB+TH) are monitored for the week. Again, those excessive temperature conditions may be monitored for each temperature sensor for each time segment (e.g., every 30 minute period) of the day. One the calendar timer is up (e.g., the week is over) per step 248, the week count in incremented at step 250 and in steps 252-258 the excessive temperature conditions are analyzed to determine if adjustment of the TH value of any temperature sensor for each 30 minute time period is necessary. Generally, if a number of temperature conditions in excess of the upper temperature limit is excessive, the upper temperature limit TH will be increased. As reflected in step 254, if the number of temperature conditions in excess of the upper temperature limit is not excessive (e.g., not more than 2) then the applicable upper temperature limit TH is not changed per step 260. On the other hand, if the number of temperature conditions in excess of the upper temperature limit is highly excessive (e.g., more than 4) per step 256, then the applicable upper temperature limit TH is increased by a first amount (e.g., 2 degrees) per step 262. However, if the number of temperature conditions in excess of the upper temperature limit is only moderately excessive (e.g., less than 4) per step 258, then the applicable upper temperature limit TH is increased by a second, lesser amount (e.g., 1 degree) per step 264. After the analysis is complete, and if the auto-tune function is ongoing (e.g., if the full number of weeks (e.g., 12) has not been completed per step 266), then the tracking and evaluation process is repeated.

This process is repeated for the full time period (e.g., 12 weeks in this example, but any other suitable time period could be selected, and in some cases the system may allow selection from among multiple possible time periods, or setting of any desired time period), per step 266, which returns to step 244 unless the full time period is complete. Similar to above, after the first week, the number of temperature condition overrides for each 30 minute time segment that is evaluated includes all weeks to date. Thus, in week 2 during steps 252-258 the temperature override count being evaluated for any given time segment and temperature sensor is actually an average of the first two weeks for that time segment and hood section. Likewise, in week 3 during steps 252-258 the temperature override count being evaluated for any given time segment and hood section is actually an average of the first three weeks for that time segment and hood section, and so on. When the full time period has concluded, the auto-tune stops per step 268. The TH values that are in place for each time segment and temperature sensor at the end of the tuning period are then maintained for ongoing operation of the exhaust system.

Thus, the above tuning operations enable both the flow rate curves and the temperature limits to be automatically adjusted based upon actual operating conditions experienced by the exhaust system, making the commissioning process for the exhaust system simpler and less labor intensive.

In general operation, as suggested above, it is possible for any given hood section to have a need for a full flow rate, while other hood sections do not. For example, where only one hood section among a plurality of hood sections has a manual override triggered or an excess temperature condition triggered. If all hood sections go to full flow in these instances, energy may be unnecessarily wasted. To reduce such waste, a method may be provided for controlling the operation of a commercial kitchen exhaust hood system of a type having multiple hood sections each with an exhaust output having an associated damper, each exhaust output feeding to a common downstream fan, wherein the operation of the fan pulls exhaust from each hood section, where damper position and fan speed control an exhaust flow rate through each hood section. The method involves establishing a target flow rate for each hood section (e.g., as described above; FT1, FT2 and FT3 for three hood sections), wherein a sum of all of the target flow rates defines a target overall hood system flow rate (e.g., FTT=FT1+FT2+FT3). Fan speed is controlled, along with the damper position of each hood section to achieve the target flow rate of each hood section (e.g., as described above). A full flow demand call from a specific hood section is identified from among the multiple hood sections (e.g., based upon a manual override trigger for that hood section or based upon an excessive temperature condition of a temperature sensor of that hood section). The full flow demand call defines a full flow target rate for the specific hood section (e.g., FFT1 for hood section 1). A differential flow target rate is determined (e.g., calculated) as the difference between the full flow target rate of the specific hood section and the flow target rate of the specific hood section (DFT=FFT1−FT1). The fan speed is then increased by a percentage amount that is proportional to A×B, where: A is the differential flow target rate divided by the full flow target rate (DFT/FFT1), and B is the target flow rate of the specific hood section divided by the target overall hood system flow rate (FT1/FTT). Damper position of each hood section is then adjusted to achieve the full flow target rate (FFT1) in the specific hood section and the flow target rate of each other hood section (FT2 and FT3). Thus, the fan speed is only increased by an amount that will be sufficient to satisfy the increase needed for the one hood section with the full flow rate demand.

In general, as exhaust hoods become more complex, maintenance continues to be an issue. Thus, a method may also be provided for identifying location of a maintenance or service issue in a commercial kitchen exhaust hood system of a type having multiple hood sections. Specifically, each of the hood sections is provided with an associated internal light element (e.g., lamp or bulb 32A-32C in FIG. 1). The method involves: monitoring at least one condition within each hood section (e.g., damper position, or filter clogging) and, based upon the monitoring, identifying a maintenance or service issue for a specific hood section from among the multiple hood sections (e.g., damper malfunction, or clogged filter). The light element of that specific hood section only is then flashed to draw attention to the location of the issue.

Wherein a user interface display (e.g, display 34 in FIG. 1) is provided, in response to identification of the maintenance or service issue, an operator alert on the user interface display may also be effected, and may be provided with a triggerable find function via the user interface display. In this implementation, the flashing step may be carried out only after the find function is triggered, so as to avoid flashing at undesired times. In one embodiment, the type or severity of the alert may be indicated by color. For example, a yellow alert may indicate that a filter is ready to be serviced, while a red alert may indicate a more immediate need for filter cleaning, while at the same time causing the damper of the hood section to go full open until the cleaning is completed.

A damper problem may, for example, be detected by a restricted flow condition of the specific hood section (e.g., the restricted flow condition may identified by monitoring an out of bounds condition of a flow control damper associated with the specific hood section).

It is to be clearly understood that the above description is intended by way of illustration and example only, is not intended to be taken by way of limitation, and that other changes and modifications are possible. For example,

What is claimed is:

1. A method of controlling a commercial kitchen exhaust hood system of a type having multiple hood sections each with an exhaust output having an associated damper, each exhaust output feeding to a common downstream fan, wherein the operation of the fan pulls exhaust from each hood section, where damper position and fan speed control an exhaust flow rate through each hood section, the method comprising:

for each hood section, monitoring at least one temperature condition of the hood section and, based upon the monitoring, establishing a target flow rate for the hood section, thereby establishing multiple target flow rates corresponding to the multiple hood sections;

based upon a sum of the multiple target flow rates, establishing a fan speed and operating the fan at the fan speed;

for each hood section, monitoring an actual flow rate through the hood section and responsively and automatically controlling damper position of the hood section to achieve the target flow rate established for the hood section; and after the target flow rate for each hood section has been achieved, repeatedly decreasing fan speed and, for each hood section, responsively and automatically adjusting damper position in the hood section to maintain the established target flow rate for the hood section, until the damper position for at least one hood section achieves a predetermined open position, in order to reduce fan energy required to maintain the target flow rates;

wherein, for each hood section, the step of monitoring at least one temperature condition of the hood section involves sensing multiple temperature sensors of the hood section, determining a proposed percent fan for each temperature sensor of the hood section and establishing the target flow rate for the hood section based upon a highest of the determined proposed percent fans, where each temperature sensor has an assigned rated fan triggering temperature field define by an upper temperature and a lower temperature and, for each temperature sensor, the proposed percent fan is determined as a ratio of (i) actual temperature less the lower temperature over (ii) the upper temperature less the lower temperature.

2. The method of claim 1, wherein the step of monitoring actual flow rate through each hood section involves evaluating an output signal of a pressure transducer of each hood section.

3. The method of claim 1, wherein the predetermined open position is defined as at least 75% open.

4. The method of claim 1, wherein the predetermined open position is defined as at least 85% open.

5. A method of controlling a commercial kitchen exhaust hood system of a type having multiple hood sections each with an exhaust output having an associated damper, each exhaust output feeding to a common downstream fan, wherein the operation of the fan pulls exhaust from each hood section, where damper position and fan speed control an exhaust flow rate through each hood section, the method comprising:

for each hood section, monitoring at least one temperature condition of the hood section and, based upon the monitoring, establishing a target flow rate for the hood section, thereby establishing multiple target flow rates corresponding to the multiple hood sections;

based upon a sum of the multiple target flow rates, establishing a fan speed and operating the fan at the fan speed;

for each hood section, monitoring an actual flow rate through the hood section and responsively and automatically controlling damper position of the hood section to achieve the target flow rate established for the hood section, wherein the step of monitoring actual flow rate through each hood section involves evaluating an output signal of a pressure transducer of each hood section; and after the target flow rate for each hood section has been achieved, repeatedly decreasing fan speed and, for each hood section, responsively and automatically adjusting damper position in the hood section to maintain the established target flow rate for the hood section, until the damper position for at least one hood section achieves a predetermined open position, in order to reduce fan energy required to maintain the target flow rates, as follows:
  (i) determining whether the damper position of any hood section is in the predetermined open position;
  (ii) if a result of the determination of step (i) is no, decreasing fan speed by an incremental amount and, for each hood section, responsively and automatically adjusting damper position in the hood section to maintain the established target flow rate for the hood section; and
  (iii) repeating steps (i) and (ii) until a result of the determination of step (i) is yes, at which point fan speed is thereafter maintained.

6. The method of claim 5, wherein the predetermined open position is defined as at least 75% open.

7. The method of claim 5, wherein the predetermined open position is defined as at least 85% open.

8. A method of controlling the operation of a commercial kitchen exhaust hood system of a type having multiple hood sections each with an exhaust output having an associated damper, each exhaust output feeding to a common downstream fan, wherein the operation of the fan pulls exhaust from each hood section, where damper position and fan speed control an exhaust flow rate through each hood section, the method comprising:
  (a) monitoring multiple temperature sensors of each hood section and determining a proposed percent fan for each temperature sensor, where each temperature sensor has an assigned rated fan triggering temperature field define by an upper temperature and a lower temperature and, for each temperature sensor, the proposed percent fan is determined as a ratio of (i) actual temperature less the lower temperature over (ii) the upper temperature less the lower temperature;
  (b) for each hood section, identifying a highest proposed percent fan from among the thermal load conditions of the hood section;
  (c) for each hood section, based upon the highest proposed percent fan, determining a target flow rate for the hood section;
  (d) summing the target flow rates to define a target system flow rate; and
  (e) based upon the target system flow rate, defining an operating speed for the fan.

9. The method of claim 8, further including:
adjusting the fan speed and the damper position for each hood section until the damper position for at least one hood section achieves a predetermined open position in order to reduce fan energy required to maintain the target flow rates.

10. The method of claim 8 wherein steps (a), (b) and (c) are repeated such that when in step (b) the highest proposed percent fan of a given hood section changes from the proposed percent fan of a first temperature sensor to the proposed percent fan of a second temperature sensor, the proposed percent fan of the first temperature sensor is no longer used to determine the target flow rate for the given hood section and the proposed percent fan of the second temperature sensor is instead used to determine the target flow rate for the given hood section.

11. The method of claim 8 wherein the upper temperature associated with one or more of the temperature sensors is adjusted according to time of day, and a transition from one upper temperature to another upper temperature occurs automatically based upon tracking of time day.

12. The method of claim 8, including:
establishing multiple flow rate curves, where each flow rate curve defines a relationship of how changes in proposed percent fan affect target flow rate;
each temperature sensor is assigned one of the flow rate curves; and
the flow rate curve assigned to one or more of the temperature sensors is changed according to time of day.

13. The method of claim 12 wherein the transition from use of one of the flow rate curves to the use of the another of the flow rate curves for each temperature sensor occurs automatically based upon tracking of time of day.

14. A method of controlling the operation of a commercial kitchen exhaust hood system of a type having multiple hood sections each with an exhaust output having an associated damper, each exhaust output feeding to a common downstream fan, wherein the operation of the fan pulls exhaust from each hood section, where damper position and fan speed control an exhaust flow rate through each hood section, the method comprising:
establishing a target flow rate for each hood section, wherein a sum of all of the target flow rates defines a target overall hood system flow rate;
controlling the fan speed and the damper position of each hood section to achieve the target flow rate of each hood section;
identifying a full flow demand call from a specific hood section from among the multiple hood sections, the full flow demand call defining a full flow target rate for the specific hood section, and responsively:
(i) determining a differential flow target rate as the difference between the full flow target rate of the specific hood section and the full flow target rate of the specific hood section;
(ii) increasing the fan speed by a percentage amount that is proportional to A×B, where:
A is the differential flow target rate divided by the full flow target rate,
B is the target flow rate of the specific hood section divided by the target overall hood system flow rate,
(iii) subsequently adjusting damper position of each hood section to achieve the full flow target rate in the specific hood section and the full flow target rate of each other hood section;
wherein the full flow demand call is triggered by one of (i) a manual override of the specific hood section or (ii) an automatically detected excess temperature condition of the specific hood section or (iii) an automatically detected excessive rate of temperature change condition or (iv) an automatically detected excessive VOC condition.

* * * * *